Patented May 29, 1951

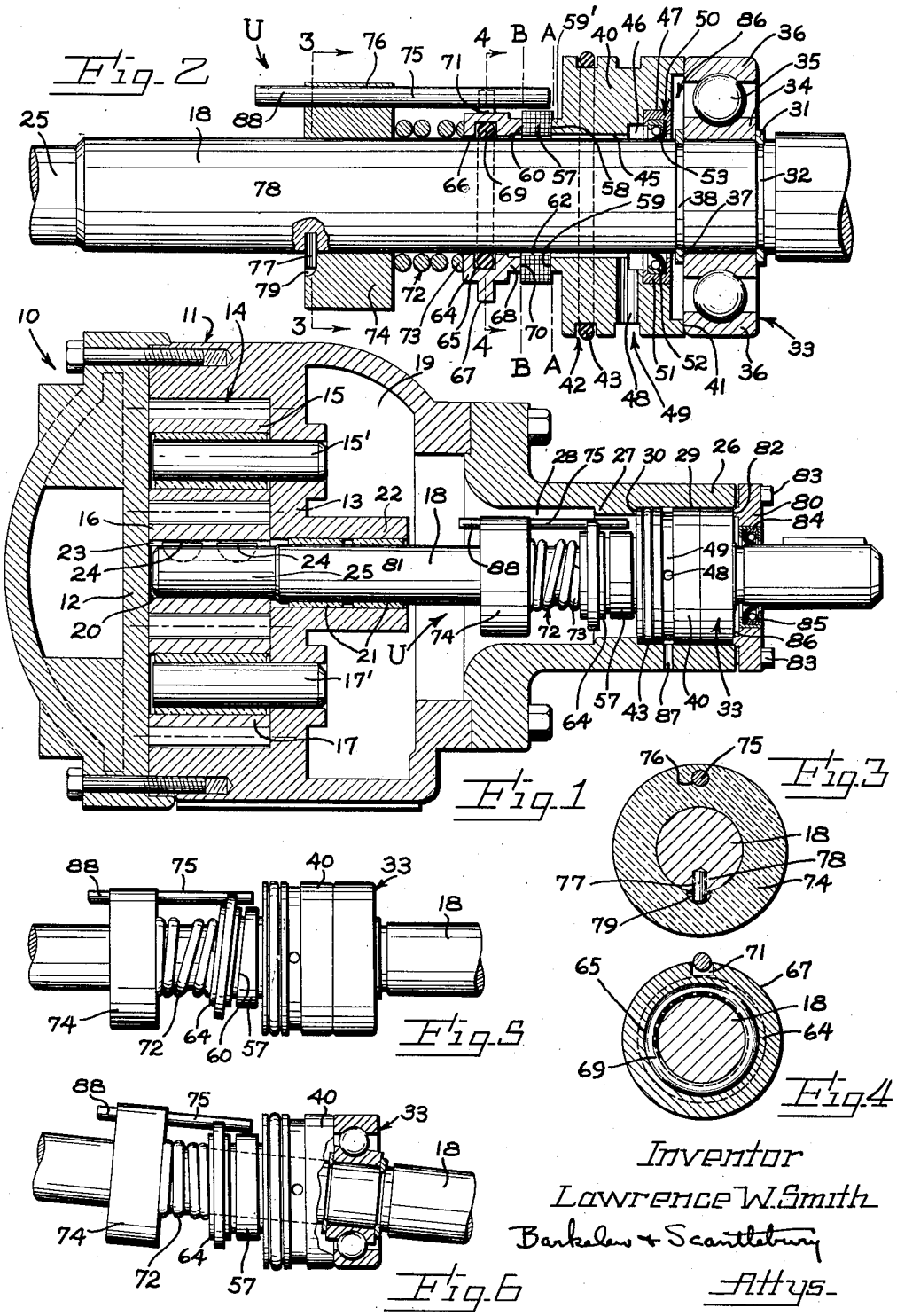

2,554,595

UNITED STATES PATENT OFFICE 2,554,595

SHAFT-OPERATED FLUID-FLOW MECHANISM AND THE LIKE AND SHAFT-SEALING MEANS THEREFOR

Lawrence W. Smith, Pasadena, Calif., assignor to Smith Precision Products Company, South Pasadena, Calif., a corporation of California Application November 29, 1948, Serial No. 62,492

8 Claims. (Cl. 308—36.2)

1

This invention relates generally to shaft-operated fluid-flow mechanism and the like and shaft-sealing means therefor, and is more particularly directed to such mechanisms wherein the sealing means is of the self-contained, self-adjusting type, as distinguished from the stuffing box and adjustable gland type.

The invention is advantageously applicable to shaft-operated or shaft-operating mechanisms of many different types wherein it is necessary to pack off the shaft and housing to prevent the leakage of fluid along and around the shaft from the interior to the exterior of the housing. For instance, it is used to great advantage in connection with shaft-driven pumps and with fluid meters—in the one case the packed-off shaft being utilized to operate pump impellers and in the other case to impart the drive from fluid driven members to counting or indicating mechanisms. Therefore, when I refer in the appended claims to a drive shaft and a member adapted to be driven by that shaft, it is to be understood that this terminology is used for the purpose of orientation and that it covers a member adapted to be driven from within the housing and a shaft adapted to be driven by that member.

Gear pumps for handling butane and propane present peculiar and very difficult shaft-packing problems, as is well understood by those skilled in the art. Therefore, since my invention has proven extremely well adapted to the solution of these problems, I have illustrated it in connection with such a pump, but it is to be understood that this is in no way limitative on the invention considered in its broader aspects, either as to type of pump or as to type of drive or driven elements.

It is a general object of my invention to provide a device of the character described which shall insure a fully effective and efficient pack-off arrangement between housing and shaft, an arrangement which is self-adjusting to compensate not only for the normal type of wear but also, within reasonable limits, for mis-alinements of shaft bearings and for non-parallel conditions of members and surfaces which, ideally, should be as nearly parallel as is within usual manufacturing tolerances, all as will be better understood from the more detailed description to follow.

It is also an object of the invention to provide a self-contained shaft-and-seal unit which, as such, may be bodily inserted in and removed from the housing of the device with a minimum of difficulty and loss of time. To install the unit, it is only necessary to thrust it endwise through an opening in the side of the housing and clamp

2 a retaining ring in place, it then being insured that, without further manipulation or adjustment, the shaft and housing are completely packed-off, and the mechanism is ready for operation with all its self-adjusting features and capacity for superior performance in full effect. To remove the unit, it is merely necessary to detach the retaining ring and withdraw the shaft. The advantages of these features are obvious, both from the standpoint of original assembly and of packing or shaft replacement.

It is also among the objects of the invention to provide a device of the character described wherein the cool-running of the shaft is insured in spite of the heat generated by reason of the frictional engagement of relatively movable parts of the sealing arrangement. Also, I provide means whereby solid particles of foreign matter in the pump chamber are kept from harmfully affecting the sealing elements.

Other objects and features of the invention will be made apparent in the following detailed description, reference being had to the accompanying drawings, wherein:

Fig. 1 is a medial section through a device embodying my invention, parts being shown in elevation;

Fig. 2 is a detached, fragmentary, medial sectional view of the shaft and shaft-carried sealing unit, parts being shown in elevation;

Fig. 3 is a reduced-scale section taken on line 3—3 of Fig. 2, omitting all elements lying to the right of those cut by the section line;

Fig. 4 is a reduced scale section taken on line 4—4 of Fig. 2, omitting all elements lying to the right of those cut by the section line; and Figs. 5 and 6 are schematic views showing, in great exaggeration, mis-alinement and non-parallel conditions which are automatically compensated for by self-adjustment of certain elements.

As stated in the introduction, my invention is here shown as embodied in a gear-pump especially well adapted to handle butane or propane and I will therefore first proceed to a description of the illustrated pump, though it is to be remembered that this showing and description of a specific embodiment are not to be taken as limitative on the invention nor on the claims appended hereto.

Numeral 10 generally indicates a conventionally illustrated gear pump which includes a housing 11 provided with spaced partitions 12 and 13 which define a gear or pumping chamber 14 containing inter-meshed pump gears 15, 16 and 17. Gears 15 and 17 are journaled on stationary supported stud shafts 15' and 17', respectively, and similar stud-supported companion gears (not shown) are angularly spaced from gears 15 and 17 and meshed with central gear 16. The fluid flow passages and the inlet and outlet ports are not here disclosed since they play no part in the present invention. It suffices merely to state that the pump is operated by driving gear 16 through shaft 18 and to state that chamber 19 is filled with fluid under pressure during operation of the pump, it following that the driving shaft must be packed-off before it leaves the housing.

Central gear 16 is, in the absence of shaft 18, centered within chamber 14 by gears 15, 16 and the mentioned companion gears (not shown) the central gear having a bore 20 which is thus held in axial alinement with bushings 21, the latter being press-fitted in the tubular extension 22 of partition 13. Gear 16 has a key-way 23 to take the keys 24 carried by the reduced-diameter portion 25 of shaft 18. The keys are here shown as of the Woodruff type, though this is not a limitative characteristic, and they project a distance from the center of the shaft which is less than the length of the radii of the bores of bushings 21; it following that the shaft, with the keys assembled therewith, may be moved endwise into and out of driving engagement with gear 16 without interference from bushings 21.

Housing 11 has a tubular extension or neck 26, an approximately central, internal annular flange 27 dividing the neck-bore into a chamber 28 in direct communication with chamber 19, and a machined bore-portion 29 which opens to the end of the neck and is axially alined with the bores of bushings 21 and the bore 20 of gear 16. Flange 27 presents an outwardly facing annular shoulder 30, the purpose of which will be later described.

I will now describe the shaft and the shaft-sealing unit U, referring particularly to Fig. 2, it being understood that the assembled unit, as shown in this figure, is bodily movable into and out of operative association with the housing 11 and gear 16. Without inferring that the unit is necessarily assembled in any particular order, I will describe it in connection with one particular order and will ascribe certain significant characteristics to the elements in the order of their assembly.

A split snap-ring 31 is first snapped into shaft-groove 32, and the ball bearing 33, made up of inner-race 34, balls 35, and outer race 36, is then moved onto the shaft from the left end thereof. The inner race tightly fits the shaft but it is capable of being thrust to the right until it engages ring 31. At this point it may be stated that the outer race 36 is adapted to have sliding fit with neck bore portion 29, it following that when the unit U is assembled with the housing 11, the right hand end of the unit is axially alined with bushing 21.

A split snap-ring 37 is then snapped into shaft-groove 38, the two snap rings thereafter engaging the opposite sides of inner race 34 in a manner to prevent relative endwise movement of bearing 33 and shaft 18.

A packing carrying sleeve 40 is then slipped over the shaft from the left, this sleeve having an annular flange 41 extending from its right hand end and adapted to engage bearing race 36. Sleeve 40, made, for instance, of cast iron, is of an outside diameter to be taken nicely within neck bore-portion 29, but it additionally has an annular groove 42 to take a sealing ring 43 which is adapted, when the unit is assembled with the housing as in Fig. 1, to seal or pack-off the sleeve and housing to prevent leakage of fluid from within chamber 28 along the outer peripheral face of the sleeve. While sealing ring 43 may be of any suitable material and cross-sectional shape, it is found that an O ring of rubber, or of an artificial rubber having properties resistant to the particular fluid being pumped, is particularly well adapted to the purpose.

The bore of sleeve 40 is of sufficiently greater diameter than is shaft 18 to provide an annular clearance space 45 which may, for instance be of a radial extent of the order of .025". The sleeve also is provided with counterbores 46 and 47, there being a radial passageway 48 leading from counterbore 46 to the external, annular groove or channel 49. Fitted within counterbore 47 is a grease-seal ring assembly 50 which may be of any suitable type. As here shown conventionally, it is of standard type, including interfitted channel members 51, 52, between which is clamped a flexible, shaft-wiping ring 53 of leather, rubber or the like.

The seal ring 57, of substantially square cross section, is then slipped over the shaft and moved to a position where its end or sealing face 58 engages the annular sealing face 59 provided at the end of annular flange 59', which flange is integral with sleeve 40 and is coaxial with respect thereto. Faces 58 and 59 are in planes normal to the axis of the shaft—or the faces may be considered as engaging in a single plane A—A which is normal to the shaft axis. The opposite end or sealing face 60 of the ring 57 is parallel to face 58, and the bore of the ring is sufficiently greater in diameter than is the shaft to provide an annular clearance space 62 of, for instance, a radial extent of the order of .010".

Seal ring 57 is rigid in nature, as distinguished from the flexible or plastic nature of many types of packing or sealing members, and is made of any suitable bearing material that is capable of being worked down or lapped in a manner to present an efficient fluid sealing face. Preferably, though not necessarily, the material should be somewhat softer than the material of sleeves 40 and 64 and should have such qualities that no special lubrication is necessary between it and the surface against which it bears and moves. For instance, ring 57 may be made of carbon-graphite (such as is known by the trade name "Graphitar") or bronze. Generally, the particular material used in a given installation is chosen with due regard to the nature of the particular duties of that installation and, in the case of a pump, with due regard to the particular nature of the fluid being pumped.

Sleeve 64, made of cast iron or other suitable material, has a central, internal, annular groove 65 opening to its bore, a central, external annular flange 67, and an annular end-flange 68. Within groove 65 is a sealing ring 69 which is of any suitable yieldable, resilient, sealing material such as rubber or an artificial rubber such as "neoprene" which is resistant to the particular fluid being pumped. Ideally, but not necessarily ring 69 is of the O type, as illustrated.

Sleeve 64 is applied to the shaft as shown in Fig. 2, its flange 68 being coaxial with and of the same diameter as flange 59'.

The sleeve bore is of a diameter sufficiently greater than the shaft as to leave an annular clearance space 66, having a radial extent of, for instance, the order of .010″ between the shaft and sleeve when they are assembled as in Fig. 2. However, the outside and inside diameter of O seal ring 69 are such that the ring is squeezed between the shaft and the sleeve in a manner to effect a leak-proof seal around the shaft at this point. The end of sleeve-flange 68 forms an annular sealing face which is parallel to and engages sealing face 60 of rigid sealing ring 57; faces 70 and 60 thus engaging one another in a plane B—B which is parallel to plane A—A and hence in a plane which is normal to the axis of shaft 18. It will be seen that sealing faces 70, 59 are coaxial and engage the ring 57 at directly opposite annular areas. External flange 67 is notched at 71 (Fig. 4) for a purpose to be described.

Helical compression spring 72 is now slipped over the shaft and moved endwise to sleeve 64, the first coil 73 of the spring preferably lying, substantially throughout its circumferential extent, flat against the sleeve. It will be noted later that the spring may be omitted in some instances.

A drive collar 74, slidingly fitting shaft 18, is then moved to a position a little to the right of that shown in Fig. 2, the spring 72 being correspondingly further compressed during such collar movement. The drive pin 75, which is press-fitted in collar-hole 76 and is parallel to shaft 18, then extends through notch 71, the pin being radially clear of the bottom wall of notch 71. With the collar manually held in this position, a key pin 77 is slipped into radial shaft-socket 78, and collar 74 is released. Thereupon spring 72 shifts collar 74 leftwise to the position of Fig. 2, the key 77 entering a collar-notch 79 and thereafter holding the shaft and collar against relative rotation. Thus, since the pin 75 is fixed in collar 74 and is entered in sleeve notch 71, the sleeve 64 (with its contained O ring 69) and the shaft 18 are held against relative rotation.

Spring 72, when thus in a position of abutment with collar 74 and sleeve 64, is under sufficient compression to insure that faces 60—70 and 58—59 are in full facial sealing engagement, with sufficient over-compression to automatically maintain such sealing engagement as the sealing ring wears thin. More will be said of the spring action at a later point herein.

With retaining ring 80 detached from the housing, unit U, assembled as above and thus in the condition of Fig. 2, is thrust endwise into the housing and to the position of Fig. 1. Due to the previously described relative arrangement and dimensions of parts, shaft-end 25 will enter the bore 20 of gear 16, and keys 24 will enter keyway 23, thus drivingly connecting gear 16 and shaft 18, the shaft portion 81 will be taken within bearing bushings 21, and sleeve 40 and bearing 33 will be taken within housing bore 29, the now axially-alined bearings 21 and 33 properly supporting the shaft for rotation.

The ball bearing 33 and chamber 86 (later to be defined) are packed with grease, and retaining ring 80 is applied to the shaft. This ring has an annular flange 82 which engages bearing race 36, and, as the retaining-ring bolts 83 are tightened down, the outer race 36 and sleeve 40 are clamped between this flange and housing shoulder 30 in a manner to hold them from both endwise and rotational movement. The inner race 34, is, of course, held by balls 35 against axial displacement, although it is capable of relative rotation with respect to the housing, and the snap rings 31 and 37, in their engagement with opposite sides of inner race 34, hold the shaft 18 against axial displacement.

It is to be noted in some installations it is unnecessary to provide a separate sealing member such as ring 43, for it is possible to secure a sealing effect adequate for some purposes, by sufficiently tightly engaging sleeve 40 with shoulder 30, for instance.

Fitted within the bore 84 of retaining ring 80 is a grease-seal ring assembly 85 which may be similar to the previously described grease-seal unit 50. Grease seals 50 and 85 define the ends of grease chamber 86 from which grease is supplied to maintain lubrication of bearing 33.

With the assembly now complete as in Fig. 1, it will be seen that O ring 69 packs-off the shaft and sleeve 64; O ring 43 packs-off the sleeve 40 and the housing, and rigid ring 57 packs-off the opposite ends of sleeves 64 and 40, it following that leakage from chamber 19 to the exterior of the housing at the shaft-entrance end is prevented.

As the shaft rotates, collar 74 and drive pin 75 cause coincident rotation of sleeve 64, the nature and point of drive application from the pin to the sleeve being such that there is no tendency to "cock" or bind the sleeve, and yet allowing such "cocking" under conditions to be described. Since there is no relative rotation between the sleeve and shaft or between O ring 69 and either the sleeve or shaft, there is no rotative wear on the sealing ring 69 and it consequently has exceptionally long useful life. Similarly, O ring 43 has no relative movement with respect to sleeve 40 or housing-neck 26 and its useful life is therefore of very considerable extent.

On the other hand, there will normally be relative rotation between rigid sealing ring 57 and sleeves 40, 64, but this relative rotation is helpful rather than harmful for it laps the sealing faces 58—59 and 60—70 in a manner tending to improve the sealing qualities.

Sealing ring 57 is, of course, free to rotate at will, except as it may be impeded or advanced by reason of its frictional engagement with sleeves 64 and 40. Theoretically the ring should rotate at one-half shaft-rotation speed, for the friction between the ring and the sleeve faces at opposite sides thereof is theoretically balanced. This is an ideal condition since, for a given period of operation, it evenly divides the wear between the two sets of sealing faces and it imposes only one-half the wear on one set of sealing faces that would occur if the ring were to rotate constantly at shaft speed or were constantly to remain stationary. In actual practice, however, it is found that in some installations the rotational speed of the ring fluctuates—that is, the ring may, for instance, remain static for a period, then rotate at shaft speed for a period, and then rotate for a period at half or some lesser or greater fraction of shaft speed. However, the fluctuations are normally such that there is insured a division of wear between the two sets of sealing faces and, on the average, this wear is approximately evenly divided, all to obvious advantage.

Should such wear or minor failure develop as might permit slight leakage of fluid past seals 69 and 57, it is important that the leaking fluid be not pressurized within clearance space 45 and thence force or work its way into grease chamber 86. It is one of the purposes of counter-bore 46 and duct 48 to bleed such leakage fluid to channel 49, whence it finds its way to atmosphere through housing port 87. Port 87 and duct 46 are preferably out of radial alinement in order to minimize the danger of exterior foreign matter entering the interior passages about the sealing elements.

In situations where it does not matter if the sleeve 64 be axially spaced from ring 57 when the pump is idle and there is no pressure in chamber 19, spring 72 may be omitted, for when the pressure in that chamber is subsequently raised by pump operation the predominant pressure at the chamber-side (remembering space 45 is vented to the atmosphere) will press said sleeve to the right in Fig. 2 and thus sealingly engage the two sleeves and ring 57—just as does spring 72—in all the situations mentioned above or hereinafter.

It is important to efficient operation of the sealing assembly that no solid particles of foreign matter work their way between the several sealing surfaces. The danger of such an effect is greatly minimized due to the rotary motion of collar 74, sleeve 64 and pin 75, which motion swirls the liquid within chamber 28 and the foreign particles are consequently thrown, by centrifugal force, outwardly and clear of the critical sealing faces. The extension 88 of drive pin 75 gives added impeller action which increases the swirling effect and the benefits derived therefrom.

It is also important that the temperature of the working parts of the seal (which temperature tends to be quite high because of the frictional engagement between relatively rotating seal-parts) be kept below certain limits in order to maintain fully efficient operation. Of course, where highly volatile liquids, such as butane, are being pumped, this problem is not too serious, for the boiling point of the liquid around the seal is quickly reached and the vaporization absorbs the heat generated by the seal members and acts to keep them at a temperature close to that of the liquid being pumped.

But where this cooling by vaporization does not occur in beneficial amount, the problem is relatively severe. It is for this reason that the chamber 28 is made quite large in comparison with the bulk of the sealing mechanism within that chamber, thus allowing free circulation and exchange of liquid around said mechanism with a consequent increase in cooling capacity. The rotary action of certain parts, as described in connection with the self-cleaning feature, and the resulting constant swirling of the liquid within chamber 28 creates a circulation of liquid which replaces the heated liquid around the seal with cooler liquid from the main body and thus does much to keep the seal mechanism in a condition of cool-running.

It is obvious that the U may be withdrawn from the housing and that the unit, itself, may be disassembled by proceeding in an order reverse to that described above. The ease and speed with which the unit may be assembled and disassembled and installed in or withdrawn from the housing, are features of obvious advantage.

So far I have treated the subject as though all parts of the shaft-and-assembly and in the housing elements were in ideal relationship. However, it is inevitable that in accuracies creep into the manufacture of certain individual pumps and that unexpected types of wear develop. I will not attempt to treat of every situation which may arise, but will speak only of one or two which are typical, and will then point out how the mechanism is self-adjusting to compensate for such conditions. However, it will be understood the mechanism is self-adjusting to compensate for other types of inaccuracy and wear.

Assume, for instance, that the ends or sealing faces 58, 60 of ring 57 are out of parallel, as indicated in extremely exaggerated form in Fig. 5. In order for the sleeve 64 now to maintain its sealing engagement with ring 57, if the latter happens to remain stationary, the sleeve must rotate about an axis which is inclined with respect to the shaft axis. Or, if the ring 57 rotates with respect both to the sleeve 40 and the sleeve 64, the sleeve 64 must somewhat gyrate in the manner of a wabble or nutation plate in order to maintain full facial engagement of the sealing surfaces. Therefore it will be seen that the sleeve 64 must be capable of such bodily movement as will enable it to maintain its seal even though it be "cocked" or tilted on the shaft. The described clearance 66 and the described pin-and-notch type of drive of the sleeve, allow such relative cocking of the sleeve, the sleeve, in effect, rocking about O ring 69 as a pivot. The spring 72 constantly thrusts against the sleeve 64 in a manner holding its sealing face 70 in full facial contact with sealing face 60 of ring 57 irrespective of the angle, constant or otherwise, of cock, and irrespective of the gyratory or nutatory movement of sleeve 64, all, of course, within reasonable limits. Thus the seal is self-adjusted to care for the non-parallelism of seal faces. During the relative movement of parts caused by such conditions of non-parallelism, the drive connection represented by pin 75 and notch 71, remains fully effective, as is obvious.

On the other hand, bearings 21 and 33 may be misalined, as represented in greatly exaggerated form in Fig. 6. This misalinement causes the shaft to be "cocked" with relation to bearing race 36, sleeve 40 and ring 57. The clearance spaces 45, 62 and 66 permit of this cocking. Spring 72, however, continues to hold sealing face 70 in full facial sealing engagement with sealing face 60 in spite of the relative gyratory movement between the shaft and sleeve 64. It will be seen that the pin-and-notch drive connection between the shaft and sleeve 64 continues to be fully effective in spite of this gyratory movement. Thus, the seal is self-adjusting to conditions arising from bearing misalinement.

As stated above, the seal is self-adjusting to many different operating conditions, normal or otherwise, and the above examples are to be taken as merely illustrative of certain of these conditions.

While I have shown and described a preferred embodiment of my invention, it is to be understood that various changes in design, structure and arrangement may be made without departing from the spirit and scope of the appended claims.

I claim:

1. In a shaft and shaft-seal unit, a shaft, a drive member mounted on said shaft for rotation therewith, a bearing member on said shaft at a point spaced axially from said drive member, coacting means on the shaft and members holding said members against separative movement axially of the shaft, a pair of axially spaced sleeves mounted on the shaft between the members, one of the sleeves being in end engagement with said bearing member, a rotary drive connection between said drive member and the other sleeve, a pair of annular sealing faces, one each on the opposed ends of the sleeves, a rigid sealing ring on the shaft and interposed between said sealing faces, there being annular clearance between the shaft and said ring and between the shaft and said sleeves, a spring applied to said other sleeve and urging it in the direction of said bearing and thereby engaging said sealing faces with the opposite sides of said rigid sealing ring, and a yieldable, resilient sealing ring positioned by said other sleeve and providing an annular seal between it and the shaft.

2. A unit as in claim 1; including also a yieldable, resilient sealing ring positioned in an annular groove provided in the outer peripheral face of said one sleeve.

3. A unit as in claim 1; in which the bearing member is a ball bearing comprising inner and outer races annularly spaced apart and held against relative axial movement by intervening bearing balls, and in which the said coacting means between the shaft and bearing includes an abutment extending radially from the shaft and engages the outermost end face of said inner race.

4. A unit as in claim 3; in which the said engagement between the bearing member and said one sleeve occurs at said outer race, only.

5. A unit as in claim 1; including also coacting means on the shaft and bearing member holding said bearing member against axial movement along the shaft towards the drive member.

6. A unit as in claim 1; including also a flexible grease-sealing unit between the shaft and said one sleeve at a point spaced axially from the sealing face thereof.

7. A unit as in claim 6; in which there is provided a radial drainage duct in said one sleeve, said duct leading from the annular space between the shaft and sleeve at a point between its sealing face and said grease-sealing unit.

8. In combination, a housing, an interior bearing within the housing, a housing portion defining a bore which opens to the exterior of the housing and which is axially alined with and of greater diameter than the inside diameter of said bearing, an internal flange in said bore intermediate its ends, a shaft and shaft seal unit embodying a shaft, a drive member mounted on said shaft for rotation therewith, a bearing member on said shaft at a point spaced axially from said drive member, coacting means on the shaft and members holding said members against separative movement axially of the shaft, a pair of axially spaced sleeves mounted on the shaft between the members, one of the sleeves being in end engagement with said bearing member, a rotary drive connection between said drive member and the other sleeve, a pair of annular sealing faces, one each on the opposed ends of the sleeves, a rigid sealing ring on the shaft and interposed between said sealing faces, there being annular clearance between the shaft and said ring and between the shaft and said sleeves, a spring applied to said other sleeve and urging it in the direction of said bearing and thereby engaging said sealing faces with the opposite sides of said rigid sealing ring, and a yieldable, resilient sealing ring positioned by said other sleeve and providing an annular seal between it and the shaft; said unit being thrustable endwise and inwardly through said housing portion bore to operatively engage an end of the shaft with said interior bearing and to engage said one sleeve with said internal flange, the sleeve and flange engagement limiting the extent of inward endwise thrust of the unit, and a detachable retaining member engaged with said housing portion and said bearing member and releasably holding said unit against outward endwise displacement.

LAWRENCE W. SMITH.

REFERENCES CITED

The following references are of record in the file of this patent:

UNITED STATES PATENTS

| Number | Name | Date |
|---|---|---|
| 849,576 | Schulz | Apr. 9, 1907 |
| 1,822,052 | Maccabee | Sept. 8, 1931 |
| 2,156,719 | Berger | May 2, 1939 |
| 2,182,072 | Czarnecki | Dec. 5, 1939 |
| 2,237,494 | McCormack | Apr. 8, 1941 |
| 2,306,417 | Wiessner | Dec. 29, 1942 |
| 2,316,565 | Collier | Apr. 13, 1943 |
| 2,366,629 | Kohler | Jan. 2, 1945 |
| 2,411,509 | Endebak | Nov. 26, 1946 |
| 2,455,700 | Porges | Dec. 7, 1948 |

FOREIGN PATENTS

| Number | Country | Date |
|---|---|---|
| 144,652 | Switzerland | 1931 |